Patented Feb. 7, 1950

2,496,289

UNITED STATES PATENT OFFICE 2,496,289

PROCESS FOR THE SEPARATION AND RECOVERY OF INORGANIC SALTS

Clifford A. Hampel, Harvey, Ill., assignor to Cardox Corporation, Chicago, Ill., a corporation of Illinois No Drawing. Application June 23, 1947, Serial No. 756,543

5 Claims. (Cl. 23—296)

This invention relates to the separation and separate recovery of sodium chlorite, potassium chlorate and sodium chloride from mixtures containing these three salts. Mixtures of these salts are produced as a result of various processes exemplary of which the following reaction may be given:

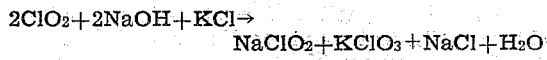

$$2ClO_2 + 2NaOH + KCl \rightarrow NaClO_2 + KClO_3 + NaCl + H_2O$$

The solution resulting from the above reaction contains as end products equivalent amounts of sodium chlorite, potassium chlorate and sodium chloride. It is to the separation and recovery of these salts from such a solution that the present invention is primarily addressed.

Pursuant to the present invention, the solution containing sodium chloride, sodium chlorite and potassium chlorate is regulated as to its water content so as to keep all of the sodium chloride and sodium chlorite in solution at a temperature selected for filtration to remove potassiumh chlorate present in the solid phase. An appropriate temperature for such filtration to remove potassium chlorate is around 5° C. At this temperature, a solution saturated with and containing equivalent parts of sodium chlorite and sodium chloride and additionally saturated with potassium chlorate will contain a minimum of 62 percent water, the salt content of the solution being composed of 3.6 percent potassium chlorate, 20.9 percent sodium chlorite and 13.5 percent sodium chloride. At stated, the water content of the solution is regulated, usually by evaporation, so as to yield a concentrated solution that is saturated with respect to both sodium chlorite and sodium chloride at the temperature selected for filtration, say 5° C. For the highest yield of potassium chlorate at this step of the process, the temperature of filtration should be as low as is convenient, and 5° C. is a suitable temperature, although somewhat higher temperatures may be used if desired. Inasmuch as a considerable quantity of solid potassium chlorate is precipitated by the concentration and cooling, it is frequently desirable to effect the separation of the precipitated potassium chlorate in a stepwise manner to thereby avoid the formation of a slurry that is too thick for efficient filtration. After filtration at approximately 5° C. to effect removal of potassium chlorate, the filtrate from the potassium chlorate filtration step is further concentrated until, at some higher temperature of the order of 60° C., it becomes saturated with respect to sodium chlorite and/or potassium chlorate. That is, this concentration of the filtrate from the original crop of potassium chlorate crystals, together with the resulting formation of crystalline sodium chloride, is continued to a point such that further concentration would result in the formation of crystalline sodium chlorite, and/or of crystalline potassium chlorate. Sodium chloride will then be precipitated due to this concentration of the solution and may be removed from the concentrated liquor by filtration at the elevated temperature at which the solution is saturated with respect to sodium chlorite and/or potassium chlorate. Usually the precipitation of the sodium chloride will be effected at a temperature substantially above 32.5° C. Accordingly, following the precipitation of the sodium chloride the solution is desirably cooled to a temperature of approximately 32.5° C., and at this temperature a second crop of potassium chlorate is precipitated and may be recovered by filtration. As illustrated by the ensuing examples, this second crop of crystalline potassium chlorate is uncontaminated with crystalline sodium chlorite. This is because the ratio of mols of sodium chlorite to mols of potassium chlorate, which ratio was approximately 1:1 in the original solution, does not exceed the ratio of 92:8 after the removal of the first crop of potassium chlorate crystals. Following the precipitation of the second crop of potassium chlorate, further cooling of the remaining solution to a substantially lower temperature brings about a precipitation of a mixture of sodium chlorite and potassium chlorate. The ratio of the two salts in this precipitated mixture is 92 moles of sodium chlorite to 8 moles of potassium chlorate, the sodium chlorite being present in the mixture in the form of sodium chlorite trihydrate.

The mother liquor left after the solid mixture of sodium chlorite trihydrate and potassium chlorate has been removed may be recycled to the beginning of the process or, if desired, it may be introduced to the filtrate following the initial potassium chlorate separation step.

The yield of mixed sodium chlorite trihydrate and potassium chlorate crystals is greater the lower the temperature employed in this step of the process. A temperature of the order of 5° C. has been found suitable.

The mixture of solid sodium chlorite trihydrate and potassium chlorate may be treated to effect separation of these salts and this treatment consists in heating the solid mixture to a temperature above the melting point of the sodium chlorite trihydrate, that is above about 34° C., so as to put all of the potassium chlorate into solution and leave a portion of the sodium chlorite in the form of an anhydrous solid which may be removed by filtration. The resulting filtrate may then be cooled to about 34° C. to cause further precipitation of potassium chlorate. After removal of the solid potassium chlorate, the remaining mother liquor may be recycled for further treatment.

In an alternative procedure, the filtrate remaining after the step of separating the sodium chloride may be cooled to a temperature below about 32.5° C. in the absence of any sodium chloride trihydrate crystals to precipitate additional quantities of potassium chlorate, the solution at this point being supersaturated with respect to sodium chlorite trihydrate. A temperature appropriate for this step of removing additional potassium chlorate lies within the approximate limits of 20° to 25° C. After the precipitated potassium chlorate has been separated by filtration, the filtrate is seeded with a few crystals of sodium chlorite trihydrate to break the supersaturation and cause the formation of sodium chlorite trihydrate crystals. Inasmuch as some heat is evolved as the sodium chlorite trihydrate is formed, it is desirable to effect additional cooling to keep the mixture within the temperature range of 20° to 25° C. In this way, pure sodium chlorite, as the trihydrate, can be separated which is not contaminated by any other salt.

The following examples are illustrative of the present invention:

Example 1

A solution of 80 parts of sodium hydroxide and 74.6 parts of potassium chloride in 1400 parts of water was reacted with 135 parts of chlorine dioxide at room temperature, the chlorine dioxide being supplied as a 5 percent gas in air. The resultant solution contained 90.5 parts of sodium chlorite, 122.6 parts of potassium chlorate and 58.5 parts of sodium chloride, all salts being in solution at 25° C. After an evaporation which removed 1131 parts of water a total of 107 parts of potassium chlorate precipitated and was removed from the slurry by filtration at 5° C.

The filtrate was again evaporated until it was saturated with respect to sodium chlorite at about 42° C., 181 parts of water being removed. Sodium chloride precipitated and 49 parts were separated by a filtration at 42° C. The filtrate now contained 88 parts of water, 90.5 parts of sodium chlorite, 9.5 parts of sodium chloride, and 15.6 parts of potassium chlorate. It was cooled to 32.5° C. and 4.2 parts of solid potassium chlorate were recovered by a filtration at this temperature. Further cooling of the solution to 5° C. precipitated a mixture of 117 parts of sodium chlorite trihydrate and 8.6 parts of potassium chlorate. Mother liquor from these solids was added after filtration to the next batch being processed. It contained 17.1 parts of sodium chlorite, 11.4 parts of potassium chlorate and 9.5 parts of sodium chloride in 44.1 parts of water.

The sodium chlorite-potassium chlorate solid mixture was further treated by heating it to 45° C. whereby 24.6 parts of solid anhydrous sodium chlorite was left undissolved. After this sodium chlorite had been separated by filtration at 45° C., the filtrate was cooled to 34° C. A crop of 3.0 parts of potassium chlorate crystals formed and was separated. The mother liquor was added back to the next batch for recycling.

Example 2

A solution of 90.5 parts of sodium chlorite, 122.6 parts of potassium chlorate and 58.5 parts of sodium chloride in 1400 parts of water was prepared by the interaction of 135 parts of chlorine dioxide with 80 parts of sodium hydroxide in 1400 parts of water followed by the addition of 74.6 parts of potassium chloride to the sodium chlorite-sodium chlorate solution. An initial evaporation of 1131 parts of water from the final mixture caused the precipitation of 107 parts of potassium chlorate which were removed from the slurry by a filtration of 5° C.

A second evaporation removed 181 parts of water and 49 parts of sodium chloride were precipitated and removed by a filtration at 42° C. This temperature was used so as not to precipitate any sodium chlorite. The filtrate now contained 88 parts of water, 90.5 parts of sodium chlorite, 9.5 parts of sodium chloride, and 15.6 parts of potassium chlorate. It was then cooled to 25° C. in the absence of any crystals of sodium chlorite trihydrate to precipitate a second crop of 9.6 parts of potassium chlorate.

Upon seeding with a few crystals of sodium chlorite trihydrate while cooling to maintain the 25° C. temperature, 73.5 parts of sodium chlorite trihydrate were precipitated. When the 27.5 parts of water in these crystals were removed by drying, after the crystals had been filtered away from the mother liquor, 46 parts of dry sodium chlorite were recovered. The mother liquor was added to the next batch for recycling.

During the evaporation operations employed in the process, prolonged exposure of solutions containing chlorite to elevated temperatures should be avoided. This is due to the slow decomposition of chlorites at high temperatures. As ordinarily practiced, standard commercial evaporation techniques should offer no difficulty, since the chlorite decomposition is minor during the few hours' exposure to the elevated temperature used for evaporation. The use of sub-atmospheric evaporation will lower the evaporation temperature and so decrease any chlorite decomposition, but the operation of this invention does not require its use.

The transition temperature of sodium chlorite trihydrate to the anhydrous salt is about 32.5° C. in the presence of solutions simultaneously saturated with sodium chloride and potassium chlorate, and cooling such a solution below about 32.5° C. will cause precipitation of sodium chlorite trihydrate. However, if no seed crystals of this hydrate are present, such a precipitation does not occur and the solution becomes supersaturated with respect to sodium chlorite.

Reference is made to the following copending applications which are related to the subject matter herein disclosed: applications S. N. 647,404 and 659,043, now Patents No. 2,489,573 and No. 2,489,575, respectively, which relate to processes for the preparation of the chlorate and chlorite salts of different metals; application S. N. 756,542 which relates to a process for the resolution of a mixture of sodium chlorate and sodium chlorite, and application S. N. 736,113 which relates to a process for the separation of potassium chlorate and sodium chlorite.

Having thus described my invention, what I claim is:

1. A process for the separation and separate recovery of sodium chlorite, potassium chlorate and sodium chloride from solutions containing all three of these salts in approximately equimolar amounts which comprises: concentrating the solution by evaporation to an extent which will effect crystallization of a first crop of potassium chlorate only at a relatively low temperature of about 5° C., separating at said relatively low temperature of about 5° C. the crystalline potassium chlorate formed, concentrating by evaporation the mother liquor from which the first crop of crystalline potassium chlorate has been removed to effect crystallization of sodium chloride, said concentration being carried out at a temperature substantially greater than that at which the first crop of potassium chlorate was crystallized, and being continued to a point such that further concentration would result in crystallization of sodium chlorite, separating the crystalline sodium chloride at approximately the temperature at which it is formed, and lowering the temperature of the mother liquor from which the crystalline sodium chloride is removed to effect the crystallization of a second crop of potassium chlorate only.

2. A process for the separation and separate recovery of sodium chlorite, potassium chlorate and sodium chloride from solutions containing all three of these salts in approximately equimolar amounts which comprises: concentrating the solution by evaporation to an extent which will effect crystallization of a first crop of potassium chlorate only at a relatively low temperature of about 5° C., separating at said relatively low temperature of about 5° C. the crystalline potassium chlorate formed, concentrating by evaporation the mother liquor from which the first crop of crystalline potassium chlorate has been removed to effect crystallization of sodium chloride, said concentration being carried out at a temperature substantially greater than that at which the first crop of potassium chlorate was crystallized, and being continued to a point such that further concentration would result in crystallization of sodium chlorite, separating the crystalline sodium chloride at approximately the temperature at which it is formed, and lowering the temperature of the mother liquor from which the crystalline sodium chloride is removed to effect the crystallization of a second crop of potassium chlorate only, removing said second crop of crystalline potassium chlorate, thereafter cooling the mother liquor from said second crop of crystalline potassium chlorate to a temperature of the order of 5° C. to effect precipitation of sodium chlorite trihydrate and potassium chlorate as a solid mixture, heating this mixture to above about 34° C., filtering the heated mixture to separate anhydrous sodium chlorite therefrom and subsequently cooling the final filtrate to effect separation of additional potassium chlorate.

3. A process for the separation and separate recovery of sodium chlorite, potassium chlorate and sodium chloride from solutions containing all three of these salts in approximately equimolar amounts which comprises: concentrating the solution by evaporation to an extent which will effect crystallization of a first crop of potassium chlorate only at a relatively low temperature of about 5° C., separating at said relatively low temperature of about 5° C. the crystalline potassium chlorate formed, concentrating by evaporation the mother liquor from which the first crop of crystalline potassium chlorate has been removed to effect crystallization of sodium chloride, said concentration being carried out at a temperature substantially greater than that at which the first crop of potassium chlorate was crystallized, and being continued to a point such that further concentration would result in crystallization of sodium chlorite, separating the crystalline sodium chloride at approximately the temperature at which it is formed, and thereafter lowering the temperature of the solution free from crystals of sodium chlorite trihydrate to recover a second crop of potassium chlorate only, subjecting the filtrate following separation of said second crop of potassium chlorate to seeding with sodium trihydrate crystals at a temperature of about 25° C. to effect precipitation of sodium chlorite as sodium chlorite trihydrate and separating precipitated sodium chlorite trihydrate from the mother liquor.

4. A process for the preparation and separate recovery of sodium chlorite, potassium chlorate and sodium chloride from an aqueous reaction mixture resulting from the reaction of chlorine dioxide with sodium hydroxide and potassium chloride comprising concentrating the solution by evaporation to an extent which will effect crystallization of a first crop of potassium chlorate only at a relatively low temperature of about 5° C., separating at said relatively low temperature of about 5° C. the crystalline potassium chlorate formed, concentrating by evaporation the mother liquor from which the first crop of crystalline potassium chlorate has been removed to effect crystallization of sodium chloride, said concentration being carried out at a temperature substantially greater than that at which the first crop of potassium chlorate was crystallized, and being continued to a point such that further concentration would result in crystallization of sodium chlorite, separating the crystalline sodium chloride at approximately the temperature at which it is formed, and lowering the temperature of the mother liquor from which the crystalline sodium chloride is removed to effect the crystallization of a second crop of potassium chlorate only, and thereafter recovering sodium chlorite from the remaining solution.

5. A process for the preparation and separate recovery of sodium chlorite, potassium chlorate and sodium chloride from an aqueous reaction mixture resulting from the reaction of chlorine dioxide with sodium hydroxide and potassium chloride comprising concentrating the solution by evaporation to an extent which will effect crystallization of a first crop of potassium chlorate only at a relatively low temperature of about 5° C., separating at said relatively low temperature of about 5° C. the crystalline potassium chlorate formed, concentrating by evaporation the mother liquor from which the first crop of crystalline potassium chlorate has been removed to effect crystallization of sodium chloride, said concentration being carried out at a temperature substantially greater than that at which the first crop of potassium chlorate was crystallized, and being continued to a point such that further concentration would result in crystallization of sodium chlorite, separating the crystalline sodium chloride at approximately the temperature at which it is formed, and lowering the temperature of the mother liquor from which the crystalline sodium chloride is removed to effect the crystallization of a second crop of potassium chlorate only, thereafter recovering sodium chlorite from the remaining solution and recycling the solution remaining after separation of the sodium chlorite to a previous stage in the process.

CLIFFORD A. HAMPEL.

REFERENCES CITED

The following references are of record in the file of this patent:

UNITED STATES PATENTS

| Number | Name | Date |
| --- | --- | --- |
| 2,169,066 | Cunningham | Aug. 8, 1939 |

OTHER REFERENCES

Sidell, "Solubilities of Inorganic and Organic Compounds," vol. I, D. Van Nostrand Co., New York (1919), pages 513 and 639.